United States Patent [19]
Beckert

[11] 3,797,528
[45] Mar. 19, 1974

[54] VARIABLE FLOW FLUIDIC TRANSDUCER
[75] Inventor: Adolf F. Beckert, St. Paul, Minn.
[73] Assignee: Honeywell, Inc., Minneapolis, Minn.
[22] Filed: Feb. 7, 1972
[21] Appl. No.: 222,416

[52] U.S. Cl................................. 138/46, 73/37
[51] Int. Cl........................... F15d 1/00, G01b 13/00
[58] Field of Search.......... 138/43, 45, 46; 137/825, 137/829, 832, 98, 101; 73/37, 37.5

[56] References Cited
UNITED STATES PATENTS

| 3,628,372 | 12/1971 | Honda | 73/37 |
|---|---|---|---|
| 2,593,185 | 4/1952 | Renick | 137/101 |
| 2,840,096 | 6/1958 | DuBois | 138/43 X |
| 3,515,161 | 6/1970 | Kent | 137/832 |
| 3,532,127 | 10/1970 | Vogelsang et al. | 138/43 |
| 3,554,208 | 1/1971 | Kizilos | 137/829 |

Primary Examiner—Charles A. Ruehl
Attorney, Agent, or Firm—Lamont B. Koontz; Trevor B. Joike

[57] ABSTRACT

A variable resistance fluidic transducer having a housing forming a generally cylindrical chamber, a spool positioned within the chamber, a circumferencial channel formed in the spool, an input port through said housing for supplying fluid to a metering slot formed in the spool, the metering slot cooperating with the channel, and a pair of outlet ports through said housing and cooperating with said channel for receiving the fluid and providing a differential output.

3 Claims, 4 Drawing Figures

PATENTED MAR 19 1974  3,797,528
FIG. 1.
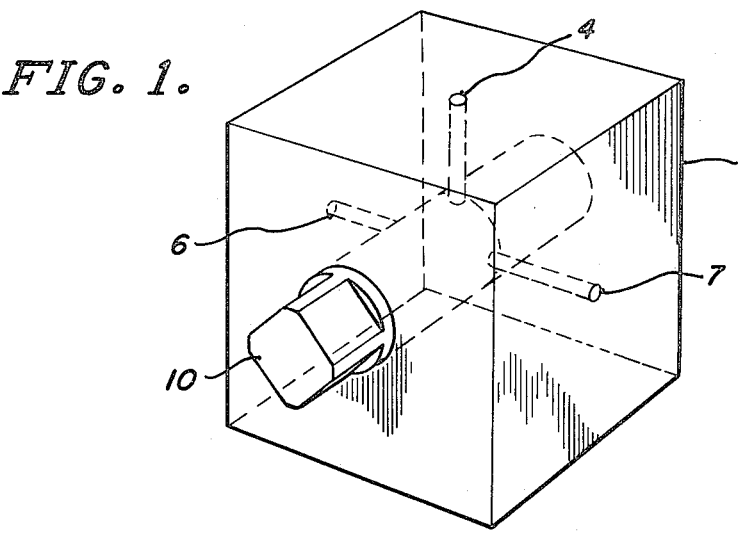
FIG. 2.
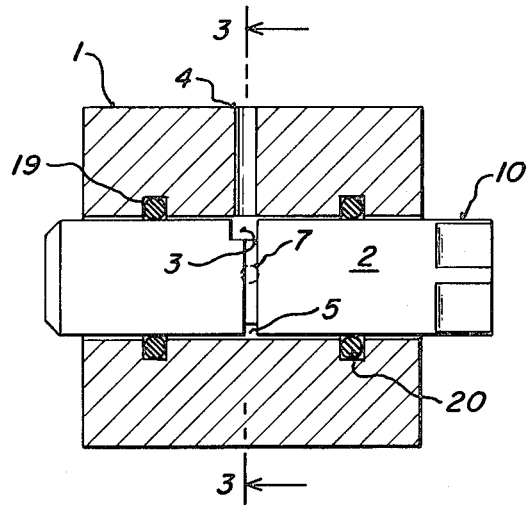
FIG. 3.
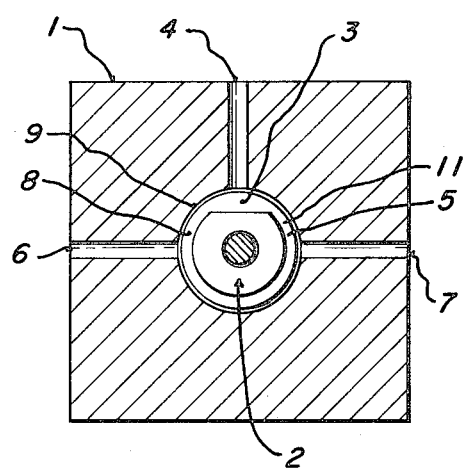
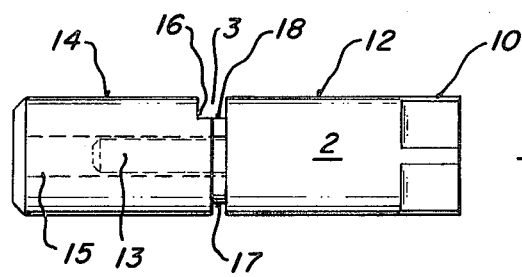
FIG. 4.

VARIABLE FLOW FLUIDIC TRANSDUCER

The invention herein described relates generally to fluid handling apparatus and more specifically to a variable resistance fluidic transducer. The device is particularly suited as a hydrofluidic device, i.e., one that controls hydraulic fluids, but can be used to control any fluid.

The transducer has a cylindrical chamber and a spool located therein having a circumferential channel forming two fluid paths of a variable length such that the resistances of the two paths change inversely with respect to one another as the pool is rotated. A pair of outlets are positioned with respect to the channel to provide a differential output. In this respect, the invention is similar to that shown in U.S. Pat. No. 3,515,161 having the same assignee as the present invention. However, the flow control device of the above mentioned patent is considerably more cumbersome, is less readily adaptable to provide a simple and compact differential flow device, and is more difficult to construct than the instant invention.

U.S. Pat. No. 3,532,126 shows a similar device but as can be readily seen from that patent, the device therein shown is a very complicated laminated structure and it in no way approximates the simplicity of the instant invention. U.S. Pat. No. 3,532,127 also falls within this category.

The present invention is a much more simple device and less cumbersome to construct since it does not require precision clearance.

These and other advantages and advancements over the art will become apparent from a detailed consideration of the drawings in which:

FIG. 1 is a perspective view of the transducer.

FIG. 2 is a side view of the device wherein the housing has been cut away to show the cylindrical chamber and the spool.

FIG. 3 is an end view taken along the cross-sectional lines A—A of FIG. 2.

FIG. 4 shows the detailed construction of the spool.

In FIGS. 1, 2, and 3, a housing 1, having a generally cylindrical chamber 9, houses a spool 2. A metering slot 3 formed in the spool 2 receives fluid from inlet port 4. A channel 5 is circumferentially formed around the spool 2 and cooperates with the metering slot 3 for dividing the fluid flow through channel 5 around the spool 2. Outlet ports 6 and 7 are adapted to receive the fluid being distributed around the channel 5, the outlet ports thereby providing a differential fluid flow signal. The end 10 of spool 2 is generally square shaped for cooperating with a mechanism (not shown), e.g., a hand crank or a motor output shaft, for rotating spool 2.

As the spool 2 rotates counterclockwise as shown in FIG. 3, the resistance of path 8, formed between inlet port 4 and outlet port 6, is reduced such that the fluid flow between the inlet port 4 and outlet port 6 increases. Likewise, as spool 2 rotates counterclockwise, the resistance of path 11, formed between inlet port 4 and outlet port 7, is increased which reduces the fluid flow between outlet port 7 and inlet port 4. Thus, upon rotation of the spool 2, the resistance of one of the paths 8 and 11 will increase whereas the resistance of the other path will decrease to provide a differential output.

FIG. 4 shows how easily the transducer can be constructed. The spool 2 is formed in two halves. The first half 12 is formed with a projection 13 thereon. The second half 14 of the spool 2 is formed having a bore 15 therein for receiving the projection 13 of half 12. Half 14 is also formed with a slot 16 therein. When the spool is to be assembled, a washer 17, having a flattened side 18 machined therein, is placed over the shaft 13 of part 12. Then part 14 is inserted over the shaft 13 such that the slot 16 cooperates with the flattened side 18 of washer 17 to form the metering slot 3. The washer 17 has a smaller diameter than do the halves 12 and 14. Thus, the channel is formed around washer 17 between halves 12 and 14.

Seals 19 and 20, in the form of o-rings, prevent fluid from leaking out of housing 1.

As can be seen, this construction is extremely simple and requires no precision machining. It is the overall arrangement of the transducer that lends itself to this type of construction.

The embodiments of the invention in which an exclusive property or right is claimed are defined as follows:

1. A variable resistance fluidic transducer comprising:

a housing defining a generally cylindrical chamber;

a rotatable spool located within said chamber and having a metering slot formed therein, said spool further having a substantially coplanar channel circumferentially formed around at least a portion of said spool for cooperating with said slot;

fluid supply means for supplying fluid through said housing to said slot and thus to said channel; and outlet means cooperating with said channel for receiving fluid from said channel whereby said resistance is determined by the length of said channel between said slot and said outlet means.

2. The variable resistance fluidic transducer of claim 1 wherein said outlet means comprises two substantially diametrically opposed ports whereby, upon rotation of said rotatable spool, the length of the channel between the input port and one of said outlet ports increases whereas the length of the channel between the input port and the other of said outlet ports decreases.

3. The variable resistance fluidic transducer of claim 1 wherein said channel means extends completely around said spool.

* * * * *